(12) United States Patent
Chen et al.

(10) Patent No.: US 8,941,641 B2
(45) Date of Patent: Jan. 27, 2015

(54) ANNOTATING OR EDITING THREE DIMENSIONAL SPACE

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 12/416,134

(22) Filed: Mar. 31, 2009

(65) Prior Publication Data

US 2010/0245344 A1 Sep. 30, 2010

(51) Int. Cl.
*G06T 15/00* (2011.01)
*G06T 19/00* (2011.01)
*H04N 21/81* (2011.01)
*G06F 17/30* (2006.01)
*G06F 3/0481* (2013.01)

(52) U.S. Cl.
CPC ............ *G06T 19/00* (2013.01); *H04N 21/8146* (2013.01); *G06F 17/30* (2013.01); *G06F 3/04815* (2013.01)
USPC ........................................................ 345/419

(58) Field of Classification Search
None
See application file for complete search history.

(56) References Cited

U.S. PATENT DOCUMENTS

| | | | |
|---|---|---|---|
| 6,281,903 B1 | 8/2001 | Martin et al. | |
| 6,405,129 B1 * | 6/2002 | Yokota | 701/438 |
| 6,466,239 B2 | 10/2002 | Ishikawa | |
| 6,587,109 B1 | 7/2003 | Rose et al. | |
| 6,727,925 B1 * | 4/2004 | Bourdelais | 715/852 |
| 2001/0022621 A1 * | 9/2001 | Squibbs | 348/232 |
| 2001/0032062 A1 * | 10/2001 | Plaskoff et al. | 703/1 |
| 2001/0043219 A1 | 11/2001 | Robotham et al. | |
| 2001/0047250 A1 * | 11/2001 | Schuller et al. | 703/1 |
| 2002/0093538 A1 * | 7/2002 | Carlin | 345/778 |
| 2004/0109031 A1 | 6/2004 | Deaton et al. | |
| 2004/0208372 A1 * | 10/2004 | Boncyk et al. | 382/181 |
| 2007/0110338 A1 * | 5/2007 | Snavely et al. | 382/305 |
| 2009/0021514 A1 * | 1/2009 | Klusza | 345/419 |
| 2009/0135178 A1 * | 5/2009 | Aihara et al. | 345/419 |

OTHER PUBLICATIONS

Mitchell, "Quicker Tagging of Video Content for iTunes/iPhone", retrieved at <<http://www.macosxhints.com/article.php?story=20090107090825274>>, Jan. 9, 2009, 3 pages.

(Continued)

*Primary Examiner* — Edward Martello
(74) *Attorney, Agent, or Firm* — Steven Spellman; Jim Ross; Micky Minhas (57) ABSTRACT

In one example, images may be used to create a model of a three-dimensional space, and the three-dimensional space may be annotated and/or edited. When a three-dimensional model of a space has been created, a user may associate various items with points in the three-dimensional space. For example, the user may create a note or a hyperlink, and may associate the note or hyperlink with a specific point in the space. Additionally, a user may experiment with the space by adding images to, or deleting images from, the space. Annotating and editing the space, rather than the underlying images, allows annotations and edits to be associated with the underlying objects depicted in the images, rather than with the images themselves.

20 Claims, 5 Drawing Sheets

(56) References Cited

OTHER PUBLICATIONS

"Newtek 3D Arsenal Academic w/ LightWave 7.5—Mac 3DACTELW7.5MAC", retrieved at <<http://www.pcmall.com/pcmall/shop/detail.asp?dpno=7236959&Redir=1&description=Newtek-3D%20Arsenal%20Academic%20w/%20LightWave%207.5%20-%20Mac-Graphics%20&%20Development%20Software>>, retrieved on Jan. 22, 2009, 3 pages.

"Photosynth", retrieved at <<http://livelabs.com/photosynth/>>, retrieved on: Mar. 26, 2009, article dated: 2009, 7 pages.

"What is Photosynth?", retrieved at <<http://photosynth.net/about.aspx>>, retrieved on Mar. 26, 2009, 1 page.

"Microsoft OneNote", retrieved at <http://en.wikipedia.org/wiki/Microsoft_OneNote>, retrieved on Mar. 26, 2009, last modified date: Mar. 19, 2009, 3 pages.

Hunter, et al., "Using the Semantic Grid to Build Bridges between Museums and Indigenous Communities", retrieved at <<http://metadate.net/filmed/pub/GGF11_SemanticGrid.pdf>>, Proceedings of the Semantic grid Applications Workshop GGF1, 2004 (year of publication is sufficiently earlier than the effective U.S. filing date and any foreign priority date so that the particular month of publication is not in issue—see MPEP 609.04(a)(I)), 13 pages.

Snavely, et al., "Photo Tourism: Exploring Photo Collections in 3D", ACM Transactions on Graphics (SIGGRAPH Proceedings), 25(3), 2006 (year of publication is sufficiently earlier than the effective U.S. filing date and any foreign priority date so that the particular month of publication is not in issue—see MPEP 609.04(a)(I)), pp. 835-846.

\* cited by examiner

ANNOTATING OR EDITING THREE DIMENSIONAL SPACE

BACKGROUND

Various schemes exist for organizing photographs or other images. Early versions of on-line or desktop software for organizing photographs followed the paradigm of a physical photo album. In an album, photos are collected together, and are organized by subject or chronology. Other software-based models for organizing photos also have been created. For example, certain web sites allow users to tag the photo with the geographic location at which the photo was taken. Thus, a user who takes a photo while in vacation on Seattle may post the photo on a web site and may apply the tag "Seattle" to the photo, or may apply an even more fine-grained tag such as "Pike's Place Market" (a specific location in Seattle). These tags are often used to facilitate a search—e.g., a user might issue a query for photos of Seattle, and a search engine could find the photo based on its tag.

While organization of photos has become more sophisticated in recent years, an issue that remains is that these schemes focus on organizing specific images, rather than on editing and reasoning with the space that the images represent. In some contexts, working with individual photos—as opposed to underlying objects depicted in the photos—can be cumbersome. For example, suppose that a person is remodeling his home and, to help with the remodeling efforts, takes several pictures of his home as it presently exists—e.g., three pictures of the kitchen, five pictures of the living room, four pictures of the bedroom, etc. The user might put these pictures in an on-line photo album and might make notes on some of the pictures. For example, on one of the pictures of the kitchen, the user might write "We could use a new sink." However, a problem that arises is that the user's note will typically be associated with the specific picture on which the note was made. If the user is looking at one of the other kitchen pictures, he will not see the note—even though the note applies to the kitchen generally, and not to one specific image of the kitchen.

SUMMARY

Photos may be aggregated to form a model in three-dimensional space, and items (e.g., notes, links, graphics, etc.) may be associated with specific points in the three-dimensional space. Thus, a user who is working with images may associate notes, links, graphics, etc., with the underlying point in space that images represent, rather than associating those items with a specific photo.

A person may take photos of a specific area—e.g., the various rooms in a house, or perhaps a field location that is being surveyed by scientists. These photos may be provided to an application that aggregates the photos and builds a model of the three-dimensional space that the photos represent. The Microsoft Photosynth system is an example of an application that builds a model from several photos, although any appropriate system could be used. Once a model of three-dimensional space is built, a representation of the model may be shown to the user. The model may include visual content taken from the various images. For example, if the user takes several pictures of his kitchen from several angles, a three-dimensional model of the kitchen may be built, and may be displayed to the user.

Once a three-dimensional model is available to work with, the user may annotate the model. For example, if the user wants to associate the note "We could use a new sink" with an image of his kitchen, the user may enter this note and may associate the note with the location of the sink in the three dimensional model. Thus, rather than associating the note with a specific photo of the kitchen (of which there may be several), the user associates the note with the kitchen itself in the three-dimensional model.

In addition to making notes in three-dimensional space, the user may interact with the three-dimensional model in various other ways. For example, the user might associate a link with a specific point—e.g., in addition to writing "We could use a new sink," the user might include a link to the web site of a specific manufacturer of kitchen fixtures. Additionally, the user may use graphics to change the image. For example, the user might cut a picture of a new sink out of an on-line catalog, rotate the image in space to fit the location of the sink in his kitchen, and then paste the image of the new sink over the old sink to see how a new sink would look in that location. In general, the annotations could take any form such as text, video, audio, etc. Additionally, it is noted that a home remodeling project provides an example, although one could interact with a three-dimensional model for any reason to support any type of endeavor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

People often take photos and annotate or edit the photo in some manner. Similarly, people capture and annotate videos. An annotation might take the form of a simple textual note on the photo, a hyperlink, or any other type of annotation. Editing could take the form of cropping the photo, superimposing an image over the photo, or any other type of editing.

Some annotations and editing relate to a specific photo. For example, a photo of the Statue of Liberty might have an annotation that says, "This photo is too dark. Use a wider aperture next time." Such an annotation relates to a specific image of the Statue of Liberty, not to the statue generally.

On the other hand, some types of annotations and editing are relevant to the objects that a photo or video represents, rather than to any specific photo or video of that object. For example, a user who is remodeling his house might take photos of various rooms in the house. The user might then annotate the photos, indicating what he wants to add to a room, or to remove from a room, or to change about a room, etc. The user might annotate a picture of a kitchen with a link to the web site of a specific plumber or contractor who focuses on remodeling kitchens. The user might copy electronic images of fixtures and furniture, and might see how these fixtures and furniture look in his house by pasting the images over the pictures of his rooms, and moving the images around to see how things fit. These types of annotations and/or edits relate to the underlying objects (i.e., the rooms) that appear in the photos, not to any specific photo. If the user made his annotations and edits to a specific photo, these annotations and edits would be associated with that specific photo, but not with other photos of the same underlying objects. Thus, if the user "tries out" a couch by pasting an image of the couch into a photo of the living room, that specific photo will include an image of the couch, but other images of the same living room will not. The user might want to annotate and edit the images in a way that associates the annotations and edits with the underlying objects in the images, rather than with the images themselves.

There are many examples in which a person might want to annotate and edit images, of which the above-mentioned homeowner is merely one example. Other examples include: a field scientist who takes pictures of natural phenomena, may want to annotate the objects he or she has seen (e.g., specific plants, specific rock formations, etc.), rather than annotating specific photos of these objects. Or, a construction manager may want to annotate pictures of a building under construction (e.g., specific beams, specific electrical wiring, etc.), and may want to associate annotation with the structures that are being photographed rather than with specific images of those structures. As another example, a doctor may use a small camera to examine internal organs (e.g., the intestines, the esophagus, etc.) from inside the body, and may want to annotate photos of these organs. The foregoing are some examples, although the subject matter herein is not limited to these examples.

The subject matter described herein may be used to annotate and/or edit moving or still images, such that the annotations and/or edits are associated with the space depicted in the images. A collection of photographs may record different parts of, or perspectives on, a three-dimensional space or object. Examples of three-dimensional spaces that may be photographically recorded include rooms in a home, the side of a mountain, an internal organ, etc. A three-dimensional model (such as a point cloud, or another representation of a three-dimensional space) may be generated from the photographs. The Microsoft Photosynth system is an example of an application that can generate a model of a three-dimensional space from images, although the three-dimensional model could be generated in any manner. As yet another example, the model could be constructed by hand, rather than with the aid of a software application. The model may be something other than a full representation of three-dimensional space; in general, the subject matter herein may be used with any model that can represent spatial relationships between images. (The concept of a three-dimensional model, as used herein, may be understood to include any spatial model, whether or not the model includes a full representation of three-dimensional space.)

Once the three-dimensional model is generated, objects that appear in images are associated in the model with their apparent locations. Thus, every point in space may be described by some coordinates, and any point in an image may be associated with a particular set of coordinates, thereby describing its location in the model. Some images may overlap, and the construction of the model may take into account the fact that different images may show the same point in space.

With the model having been constructed, actions such as annotation and editing may be performed with respect to the model. Thus, if a user wants to add a note (e.g., in the form of text, video, audio, a photo collection, etc.) that relates to a kitchen fixture shown in the model, the user can provide an indication of the location with which he or she wants to associate an annotation. The location might be indicated, for example, by drawing a polygon around the region with which the annotation is to be associated, although the location could be indicated in any manner. The user may then type a note, scan a handwritten note, type a hyperlink, record an audio note, capture a visual note with a camera, etc., In general, the user may provide any type of content, and may associate that content with the location, within the model, that the user has indicated.

In addition to annotating content, the user may also edit content. For example, the user might paste a graphic into a specific location in the model. A graphic might be a two-dimensional image (e.g., a drawing, a photograph, etc.), and the user could be provided with tools to rotate and/or resize the graphic to make it fit within the perspective and scale of the model. As another example, the user might have a three-dimensional object (e.g., an object created with a Computer Aided Design, or "CAD," program), and might insert the three-dimensional object into the model, in which case points in the three-dimensional object could be assigned specific coordinates in the model.

Figure 1:
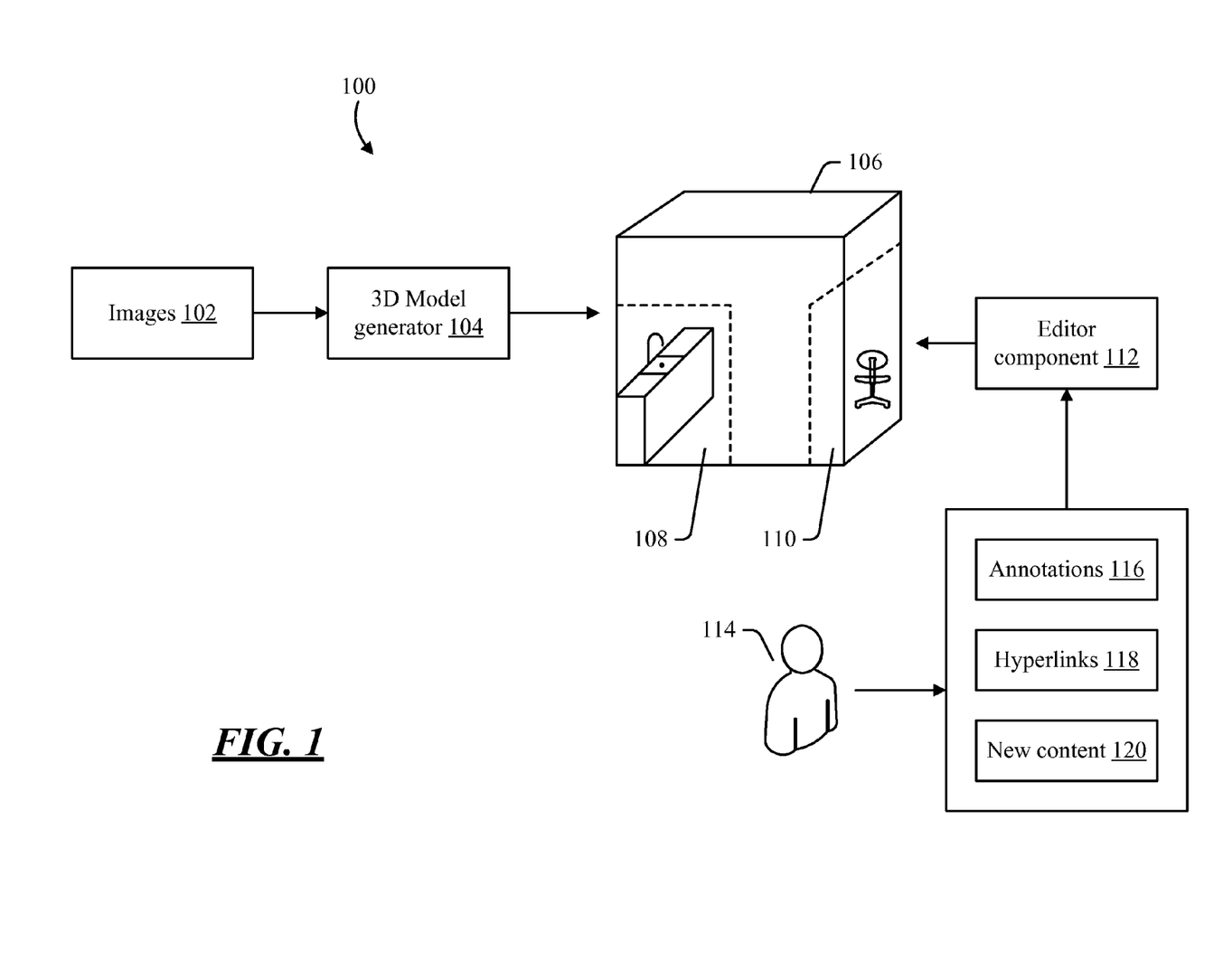
FIG. 1 is a block diagram of an example system in which annotations and/or edits may be applied to a model.

Turning now to the drawings, FIG. 1 shows an example system 100 in which annotations and/or edits are applied to a three-dimensional model. Images 102 record some physical scene—e.g., rooms in a house, rock formations in nature, a human internal organ, etc. Images 102 may be of any type of scene. Images 102 may be provided to three-dimensional model generator 104. One example of a model generator is the Microsoft Photosynth system, although any appropriate model generator may be used.

Three-dimensional model generator 104 receives images 102 and generates a three-dimensional model of the scenes and objects that appear in the images. The images could be still images or moving images. For example, three-dimensional model generator 104 may compare the various images included among images 102, and may attempt to identify overlap among the images. If, for example, two images appear to show the same object, then the different perspectives from which the two images were taken can be calculated. These different perspectives can be used to construct the three-dimensional space in the vicinity of the object. All of the pictures can be examined using this technique, in order to construct a model of the three dimensional space depicted by the pictures. The foregoing is one example of a technique that may be used to construct a model of a three-dimensional space, although any technique could be used. As yet another example, a camera used to capture images could be connected to a locating device (e.g., a device based on Global Positioning System (GPS) technology, or based on triangulation technology, etc.). As yet another example, a sensor such as an accelerometer could be attached to the camera and could be used to determine the relative locations from which various images were captured. Thus, the location from which each image was captured could be recorded, and data concerning the location from which each picture was captured could be used to construct a three-dimensional model.

Using some technique (such as those described above, or other techniques), model generator 104 may generate a three dimensional model 106. In the example of FIG. 1, model 106 is a model of various rooms in a house, which may have been constructed from pictures that a person took of the house. For example, model 106 shows two rooms 108 and 110. Room 108 is a kitchen (showing a kitchen countertop, with a sink and a faucet), and room 110 is a living room (showing a chair). Images 102 may include various pictures of the kitchen and living room of a house and, by analyzing these images, model generator 104 may have constructed model 106, in which objects such as the countertop and chair, as well as the physical relationship between room 108 and 110, are placed in three-dimensional space as shown.

An editor component 112 may allow a user 114 to add annotations to model 106 and/or to edit model 106. Editor component 112 may be software, or may be a specific feature of a software package. For example, a photo management application may be implemented as an on-line web application, in which case editor component 112 may be a feature of the on-line application, which user 114 accesses through a browser. As another example, editor component 112 may be part of a client-side photo-organizing application, in which case editor component 112 might provide its own user interface (e.g., other than a web browser), which allows user 114 to interact with editor component 112. Regardless of the form that editor component 112 takes, editor component may allow user 114 to annotate and/or edit model 106.

Annotations 116, hyperlinks 118, and new content 120 are various examples of items that editor component 112 may receive from user 114. For example, user 114 may want to attach a note (e.g., a text note, an audio note, a video note, etc.) to a specific location in the three-dimensional space represented by model 106—e.g., "We could use a new sink" could be associated with the physical location in three-dimensional space at which the sink in model 106 is shown. User 114 could type the note with a keyboard, could write the note with a stylus on a touch screen, could scan a handwritten note, could record the note with an audio or video capture device, etc. User 114 could provide the note to editor component 112, which could then associate the note with the location in three-dimensional space that has been chosen by user 114. User 114 might choose the location by drawing a polygon around the location—e.g., user 114 could use a stylus or pointing device (or any other type of physical input device) to draw a boundary around the sink, in order to indicate the location in three-dimensional space with which user 114 wants to associate the note. The location with which the note is to be associated may be a point, or may be an area. Thus, one sense in which the polygon may define the user's chosen location is that the polygon may contain the location (e.g., if the location is a point, or if it is a region that is smaller than, and contained within, the drawn polygon). Or, another sense in which the polygon may define the user's chosen location is that the chosen location may be a region whose boundary coincides with that of the polygon.

A note is one example of annotations 116. Hyperlinks 118 are another example of annotation 116. For example, user 114 could use editor component 112 to provide a hyperlink to be associated with a particular location in three-dimensional space. If user 114 associates the hyperlink with the sink, then user 114 might interact with model 106 by clicking the sink. Such a click could be interpreted as a request for content associated with the sink, so the resulting action could be to open the link in user 114's browser. So, user 114 might associate, with the location of the sink, a link to a manufacturer of kitchen fixtures. If user 114 subsequently clicks on the sink, the web site of that manufacturer might appear in user 114's browser window, thereby reminding user 114 of where to get a new sink.

Another type of item that user 114 could add to model 106 is new content 120, such as a graphic. For example, user 114 could try out new furniture in the living room by copying images from on-line furniture catalogues and pasting the images into the portion of the model that includes the living room. If user 114 wants to paste a two-dimensional (planar) graphic, then editor component 112 could present user 114 with an image of the graphic, and could allow user 114 to rotate the graphic around various axes, or to expand and contract the graphic, thereby allowing user 114 to manipulate the graphic to fit the size and perspective of model 106. As another example, the graphic could be in three dimensions. User 114 might use a three-dimensional drawing application, such as a CAD application, to create a 3-D graphic. Points in the three-dimensional graphic could be mapped to specific points in model 106, thereby placing the three-dimensional graphic into three dimensional space as part of model 106.

In addition to adding items to model 106, a user might also delete items from model 106. For example, the user might draw a boundary (using a stylus, pointing device, etc.) around a specific region in model 106, and may indicate that the region is to be deleted. Thus, the user might be shown a view of model 106 that omits images (or portions of images) that are within the area that the user has requested to delete. Thus, the representation of the model would be shown without any content in the region deleted by the user. It is noted that, while model 106 may represent a three-dimensional space, the user is typically shown a projection of model 106 on a two dimensional screen. Thus, the user can draw a shape (e.g., circle, polygon, etc.) to indicate what area is to be deleted, and the area that may be omitted from the user's view is the portion of the projection that is bounded by the shape the user has drawn.

Figure 2:
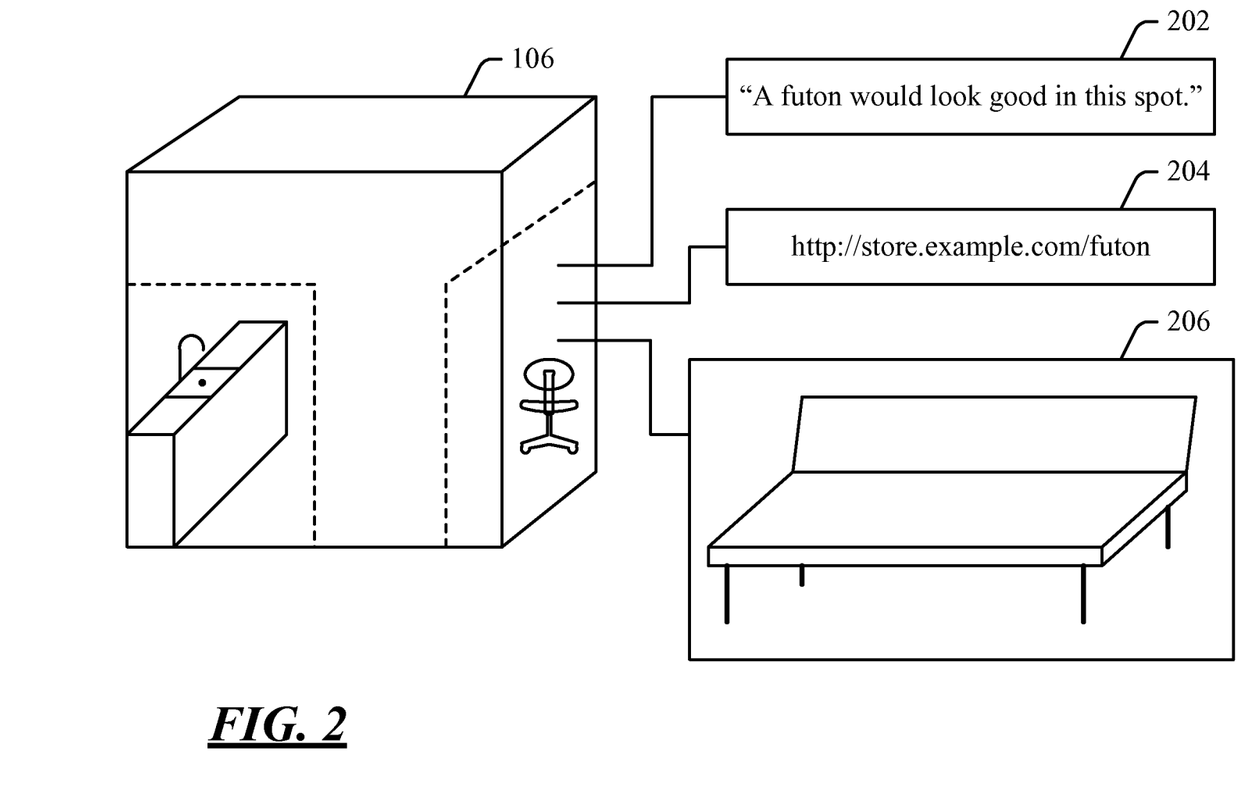
FIG. 2 is a block diagram of various types of actions that may be taken with respect to a model.

FIG. 2 shows various types of actions that may be taken with respect to model 106. As noted above, one type of action that may be performed with respect to a model is to associate a note 202 with a specific location in the three-dimensional space represented by the model. Thus, a user (e.g., by using editor component 112, shown in FIG. 1) may add note 202 to model 106, and may associate that note with a location in the living room. For example, the note may say, "A futon would look good in this spot." Similarly, the user could associate a hyperlink 204 with a specific location. For example, the user may want to link to a web site where he or she can buy a futon, so the user might associate hyperlink 204 with a particular location in the three-dimensional space represented by model 106. Or, as a further example, the user might want to see what a futon looks like in the space. Thus, the user might obtain an image 206 of a futon, and might add it to model 106 in an appropriate space, as a way of seeing what a futon would look like in the living room.

The foregoing describes some examples of actions that may be performed with respect to model 106, although any appropriate action could be performed with respect to model 106.

Figure 3:
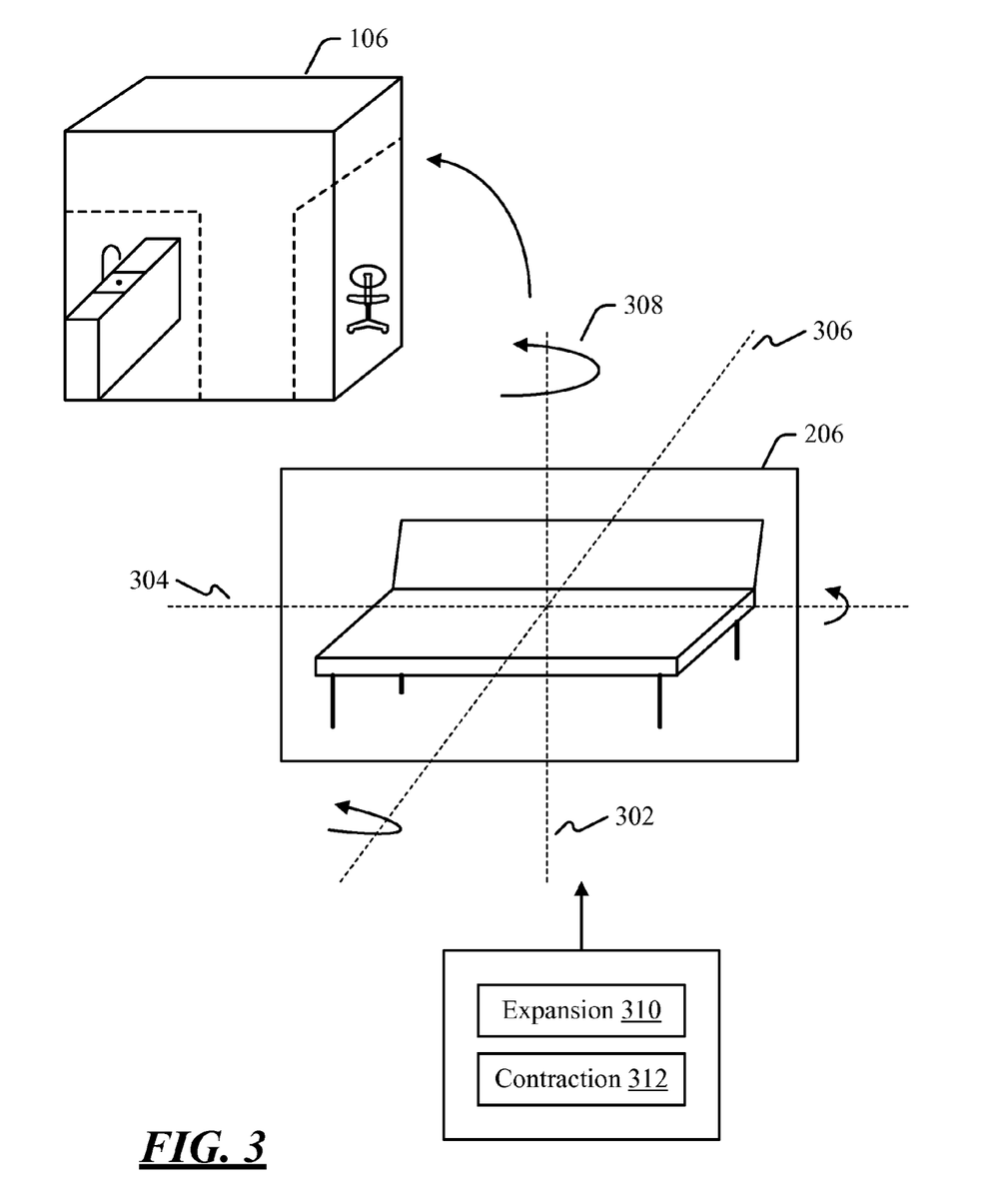
FIG. 3 is a block diagram of an example image, and of manipulation of that image.

As noted above, when an image is to be added to a model, the image can be manipulated so that it may fit the size and perspective of the model. FIG. 3 shows an example of how an image may be manipulated.

Image 206 (introduced in FIG. 2) is an image that is to be added to model 106 at some point in model 106's three-dimensional space. For example, image 206 may be a picture of a futon that a user has copied from an on-line furniture catalogue. Image 206 may be a two-dimensional image having a certain size and perspective, and a user may want to change that size and perspective to make image 206 fit within the size and perspective of model 106.

In order to manipulate image 206, an editor (e.g., editor component 112, shown in FIG. 1) may provide various controls that allow a user to manipulate the image. Thus, image 206 is shown as if mounted in a plane, and controls may be provided that allow the user to rotate image 206 around axes 302, 304, and 306. For example, a user could be shown arrows (such as arrow 308), and could use a pointing device to specify rotation about one or more of the axes.

In addition to rotation, various other transformations may be performed on image 206. For example, controls may be provided to a user that allow the user to specify that image 206 is to be expanded 310 or contracted 312.

The foregoing shows certain examples of manipulation of image 206, although any type of manipulation could be performed.

Figure 4:
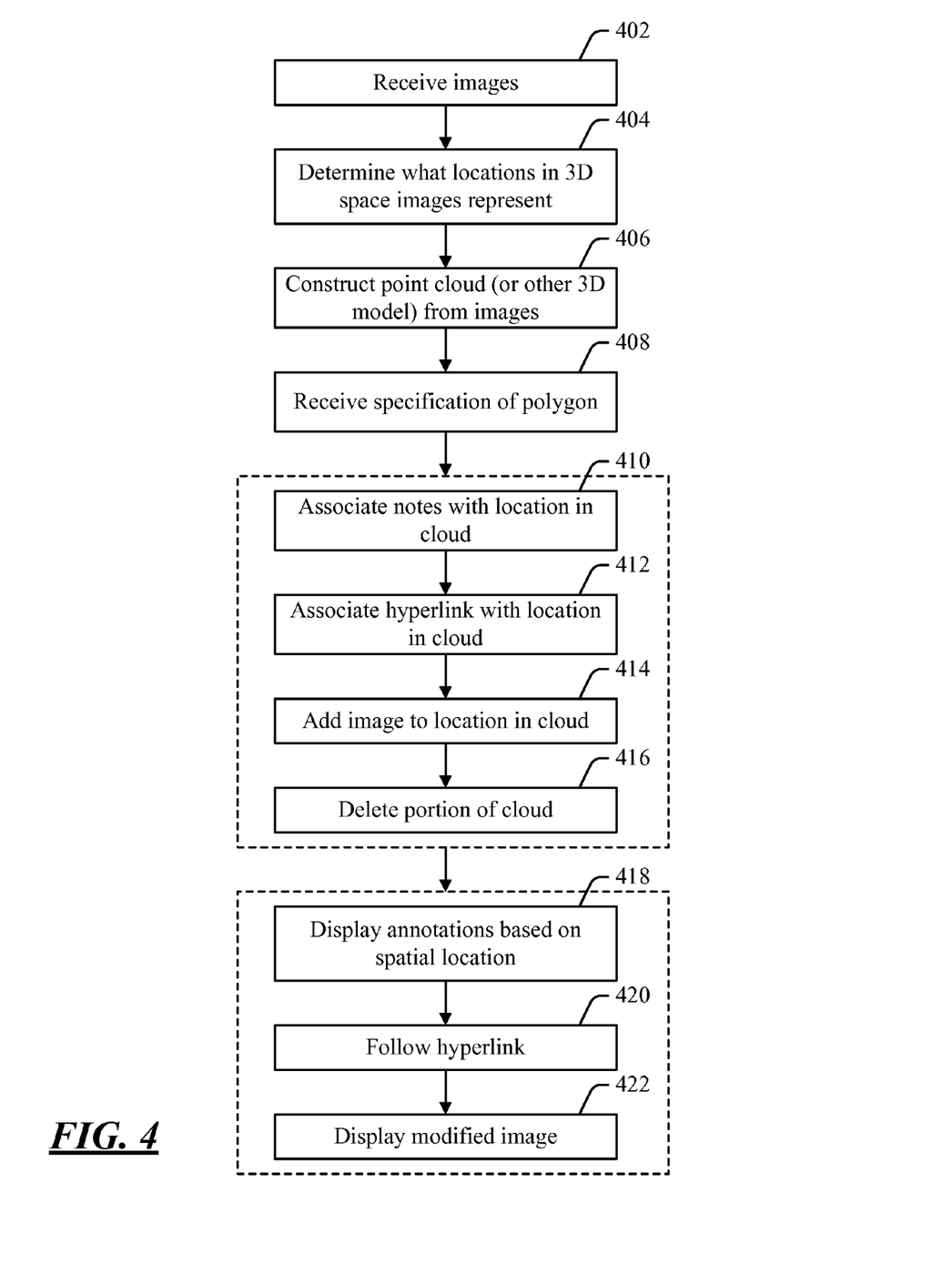
FIG. 4 is a flow diagram of an example process in which images may be associated with locations in a three-dimensional space.

FIG. 4 shows an example process in which images may be associated with locations in a three-dimensional space. Before turning to a description of FIG. 4, it is noted that FIG. 4 is described, by way of example, with reference to components shown in FIGS. 1-3, although the process of FIG. 4 may be carried out in any system and is not limited to the scenarios shown in FIGS. 1-3. Additionally, FIG. 4 shows an example in which stages of a process are carried out in a particular order, as indicated by the lines connecting the blocks, but the various stages shown in these diagrams can be performed in any order, or in any combination or sub-combination.

At 402, a set of images may be received. For example, the images may have been captured with a still or video camera, and may be received by model generator 104 (shown in FIG. 1). At 404, it may be determine what locations in three-dimensional space the images represent. As noted above, various techniques (e.g., comparing overlapping portions of various images, or using position data such as that from a GPS-based or triangulation-based system, etc.) may be used to determine where, in three-dimensional space, the various objects in an image are located. Once the locations of the objects have been determined, a three-dimensional model, such as a point cloud, may be constructed from the images (at 406), where objects shown in the images are placed at locations, in the three-dimensional cloud, that correspond to the actual positions of the objects that the images depict.

At 408, a specification of a polygon may be received in order to define the place in the three-dimensional model with which an action and/or item is to be associated. For example, a user may use a stylus, pointing device, etc., to draw a polygon around an area in the three-dimensional model. A polygon is a planar figure that exists in two dimensions. However, a typical representation of a three-dimensional model, as shown on a user's display device, is a projection of the three-dimensional model into two dimensions. Thus, the user could draw a polygon in the two-dimensional projection of the three-dimensional model, and the specific place in three-dimensional space that the user wishes to annotate or edit could be inferred from the polygon that the user draws on the projection.

Stages 410-416 show how various items could be associated with a location in a three-dimensional model. The location with which an item may be associated may be determined by the polygon that was drawn at 408. At 410, a note (in the form of text, audio, still images, moving images, photo collections, etc.) may be associated with a location in a cloud (or other three-dimensional model). At 412, a hyperlink may be associated with a location in a cloud (or other three-dimensional model). As noted above, a textual note and a hyperlink are both examples of annotations that a user could make to a three-dimensional model. At 414, an image may be added to a location in a cloud (or other three-dimensional model). FIG. 3, discussed above, shown an example of how an image may be manipulated and added to a three-dimensional model. The notes, hyperlinks, images, audio, video, and photo collections, as mentioned above, are all examples of items that could be added to a three-dimensional model and/or could be associated with a location in a three-dimensional model.

At 416, a portion of a cloud (or other three-dimensional model) may be deleted. As discussed above, deletion could be performed by omitting images (or portions of images) from the vicinity of the deleted location when the model is displayed to the user.

Stages 418-422 show various actions that could be performed based on a three-dimensional model that has been annotated and/or edited in the manner described above. At 418, annotations may be displayed in ways that reflect where, in three-dimensional space, the annotations have been placed by a user. For example, if the user has added a note to the spatial location where the kitchen sink is shown, then a representation of the model could be displayed to the user, with the user's note being shown in vicinity of (or otherwise in visual association with) the kitchen sink. This note could be shown, for example, in the form of a pop-up window or box that is shown when the user moves a cursor over the kitchen sink. The displaying of images and/or annotations may be in a tangible form. For example, the images and/or annotations may be shown on a physical display device that is physically connected to the user's computer. As additional examples, if the item associated with a location in space is an audio or video, then the audio could be rendered audibly, or the video could be played.

At 420, a hyperlink that is associated with a location may be followed. For example, if the user has associated a hyperlink with the kitchen sink, then clicking the kitchen sink may cause a browser window to be opened, and may cause the web page referenced in the hyperlink to be displayed in that browser window.

At 422, a modified image of the model may be displayed. For example, if the user has edited the model by adding graphics to the model (e.g., by adding an image of a futon to the living room in model 106, shown in FIGS. 1-3), then a representation of the model may be shown to the user with the image added. Similarly, if the user has added a three-dimensional graphic to the model (three dimensional in the sense that the graphic is non-planar), then the model may be shown with the three dimensional graphic occurring, as part of the model, at the user's specified location.

Figure 5:
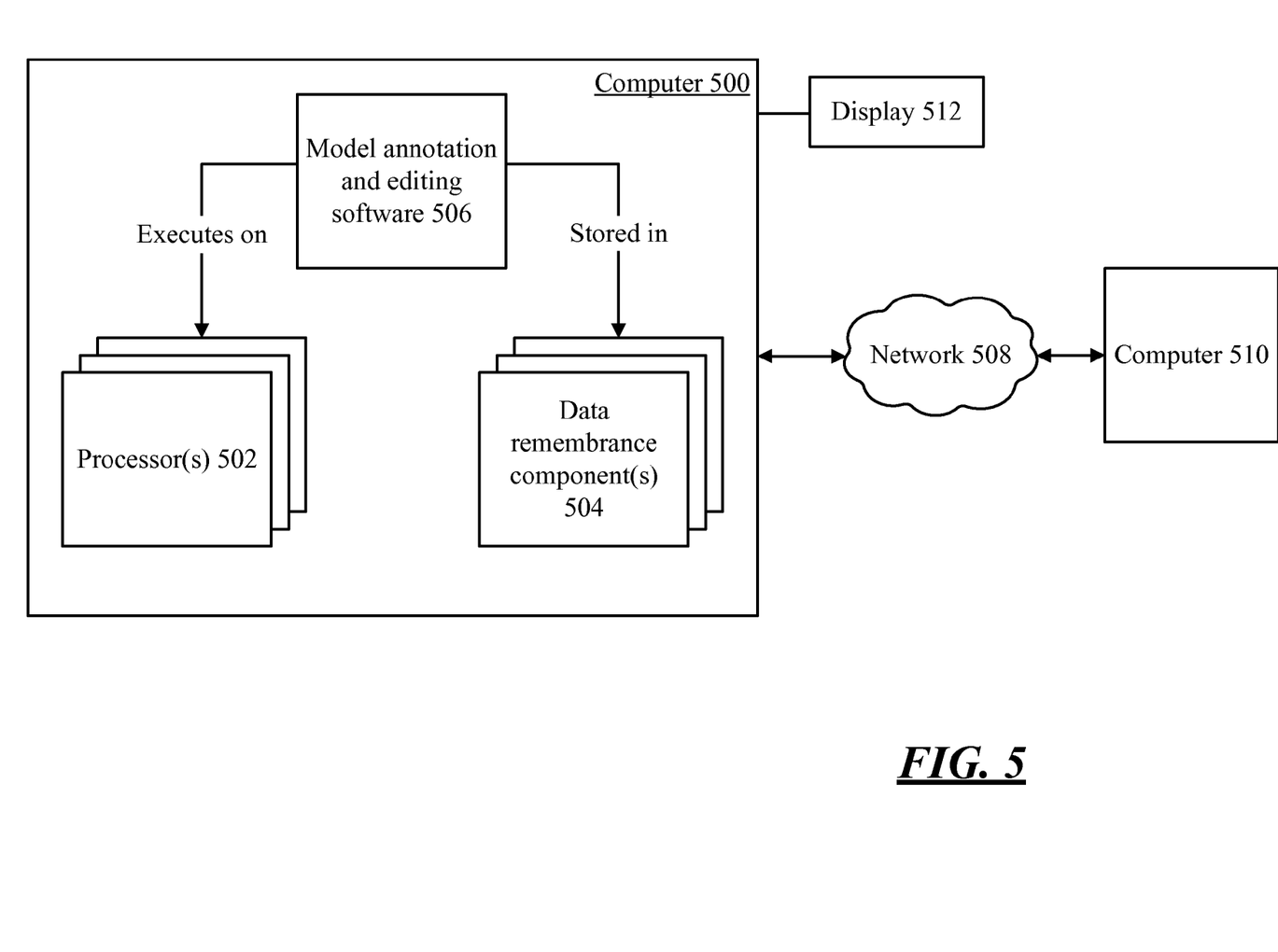
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is model annotation and editing software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., a desktop computer, a laptop computer, a handheld computer, a server computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable disks or memories that store executable instructions that, when executed by a computer, cause the computer to perform acts comprising:
    receiving a plurality of images;
    determining what regions, in three-dimensional space, said images represent;
    constructing a three-dimensional point cloud based on said images and further based on what regions said images represent;
    receiving an item, said item comprising an image of an object to be inserted into said three-dimensional point cloud, said image of said object being obtained from a location other than said three-dimensional space that said plurality of images represent, said image of said object being a three-dimensional image created by a user from whom said item is received;
    receiving a location, in said three-dimensional point cloud, at which said item is to be placed;
    associating said item with said location; and
    displaying modified versions of said plurality of images, with said item, in a tangible form, said modified images having said object inserted into said images at points in said images that correspond to said location.

2. The one or more computer-readable disks or memories of claim 1, wherein said receiving of said location comprises:
    receiving, from said user through a physical input device, an indication of a polygon that defines a region, said location being, or being within, said region.

3. The one or more computer-readable disks or memories of claim 1, wherein said item comprises a note, and wherein said displaying comprises:
    displaying said note with a portion of said images that are associated with said location.

4. The one or more computer-readable disks or memories of claim 1, wherein said item comprises a hyperlink, and wherein said acts further comprise:
    receiving a request to access content associated with said location; and
    based on said request, accessing said hyperlink.

5. The one or more computer-readable disks or memories of claim 1, wherein said item comprises a graphic, and wherein said displaying comprises:
    displaying said graphic as occurring in said three-dimensional point cloud in said location.

6. The one or more computer-readable disks or memories of claim 5, wherein said graphic comprises a two-dimensional image, and wherein said acts further comprise:
    receiving an indication of a rotation of said two-dimensional image around one or more axes.

7. The one or more computer-readable disks or memories of claim 1, wherein said item comprises a video, and wherein said displaying comprises:
    displaying said video with a portion of said images that are associated with said location.

8. The one or more computer-readable disks or memories of claim 1, wherein said item comprises audio, and wherein said acts further comprise:
    rendering said audio.

9. The one or more computer-readable disks or memories of claim 1, further comprising:
    receiving an editing instruction to remove content that occurs in a region of said three-dimensional point cloud.

10. The one or more computer-readable disks or memories of claim 1, said object being a piece of furniture, said image of said furniture being obtained from a published source.

11. A system for interacting with images in three-dimensional space, the system comprising:
    a data remembrance component;
    a processor;
    one or more components that are stored in said data remembrance component and that execute on said processor, said one or more components comprising:
        a three-dimensional point cloud generator that receives a plurality of images and that generates a point cloud that associates said images with points in three-dimensional space; and
        an editor component that receives an item, and that further receives an indication of a location in said three-dimensional space with which said item is to be associated, said item comprising an image of an object to be inserted into said three-dimensional point cloud, said image of said object being obtained from a location other than said three-dimensional space that said plurality of images represent, said image of said object being a three-dimensional image created by a user from whom said item is received by said editor component;
    wherein said system further comprises:
    a display that shows modified versions of a set of said images in said three-dimensional space that are associated with said location, and that shows said item in association with images in said set, said modified images having said object inserted into said images at points in said images that correspond to said location.

12. The system of claim 11, wherein said editor component receives, from said user through a physical input device, an indication of a polygon that defines a region that coincides with, or contains, said location.

13. The system of claim 11, wherein said item comprises a note, and wherein said display shows said note with images in said set, or portions of images in said set.

14. The system of claim 11, wherein said item comprises a hyperlink, and wherein the system receives a request to access content associated with said location and, based on said request, accesses said hyperlink.

15. The system of claim 11, wherein said item comprises a graphic, and wherein said display shows said graphic as occurring in said three-dimensional space at said location.

16. The system of claim 15, wherein said graphic comprises a two-dimensional image, and wherein said editor component receives an indication of a rotation of said two-dimensional image around one or more axes.

17. The system of claim 15, wherein said graphic comprises a three-dimensional image, and wherein said editor component places said graphic at a non-planar set of points in said three-dimensional space.

18. A method of interacting with visual content in three-dimensional space, the method comprising:
using a processor to perform acts comprising:
receiving a plurality of images;
constructing a three-dimensional space from said images, in which said images are placed, in said three-dimensional space, at locations that correspond to locations of objects that the images depict;
receiving, from a user, a specification of a region;
receiving, from said user, an indication of an action to be performed with respect to said region;
performing said action; and
displaying, to said user, a first representation of said three-dimensional space that includes a second representation of said action at said region, said action comprising inserting an image of an object into said region of said three-dimensional space, said image of said object being obtained from a location other than said three-dimensional space that said plurality of images represent, said image of said object being a three-dimensional image created by said user, said action comprising deletion of a portion of said three-dimensional space, said performing of said action comprising storing data that indicates deletion of content in said region, and said displaying comprising showing a modified version of said first representation of said three-dimensional space that comprises said object inserted at points in said plurality of images that correspond to said region without showing images that are associated with said region.

19. The method of claim 18, wherein said action comprises addition of a graphic to said three-dimensional space, wherein said performing of said action comprises storing data that represents an association between said region and said graphic, and wherein said displaying comprises showing said graphic at said region in said three-dimensional space.

20. The method of claim 18, wherein said action comprises associating a note or a hyperlink with said region, and wherein said displaying comprises showing said note or hyperlink at said region in said three-dimensional space.

* * * * *